(12) United States Patent
Kim

(10) Patent No.: US 11,868,664 B2
(45) Date of Patent: *Jan. 9, 2024

(54) ELECTRONIC SYSTEM HAVING MEMORY SYSTEM AND HOST FOR MANAGING REQUEST SET QUEUE

(71) Applicant: SK hynix Inc., Icheon (KR)

(72) Inventor: Jae Hoon Kim, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,112

(22) Filed: Dec. 14, 2022

(65) Prior Publication Data

US 2023/0120263 A1   Apr. 20, 2023

Related U.S. Application Data

(63) Continuation of application No. 16/999,953, filed on Aug. 21, 2020, now Pat. No. 11,556,278.

(30) Foreign Application Priority Data

Mar. 13, 2020   (KR) ........................ 10-2020-0031537

(51) Int. Cl.
*G06F 3/06* (2006.01)
*G06F 12/10* (2016.01)

(52) U.S. Cl.
CPC .......... *G06F 3/0659* (2013.01); *G06F 3/0611* (2013.01); *G06F 3/0673* (2013.01); *G06F 12/10* (2013.01); *G06F 2212/1024* (2013.01)

(58) Field of Classification Search
CPC .... G06F 3/0659; G06F 3/0611; G06F 3/0673; G06F 3/061; G06F 12/0246; G06F 2212/7202
See application file for complete search history.

(56) References Cited

U.S. PATENT DOCUMENTS

| | | |
|---|---|---|
| 2012/0066435 A1 | 3/2012 | Colgrove et al. |
| 2013/0132612 A1 | 5/2013 | Chiu et al. |
| 2019/0138473 A1 | 5/2019 | Kim et al. |

FOREIGN PATENT DOCUMENTS

| | | |
|---|---|---|
| KR | 20190019215 A | 2/2019 |
| KR | 20190051416 A | 5/2019 |

*Primary Examiner* — Tracy A Warren

(57) ABSTRACT

The present technology relates to an electronic system including a host and a memory system. The host includes a request merge manager configured to generate one or more operation request sets, a first request set queue configured to store one or more of transmission request sets and operation request sets, a first scheduler configured to control the priorities of the operation request sets and the transmission request sets, a second request set queue configured to store the operation request sets sequentially output from the first request set queue, a second scheduler configured to generate a transmission request set, and a request set detector configured to transmit, to the first scheduler, request information on a request set having a highest priority.

7 Claims, 16 Drawing Sheets

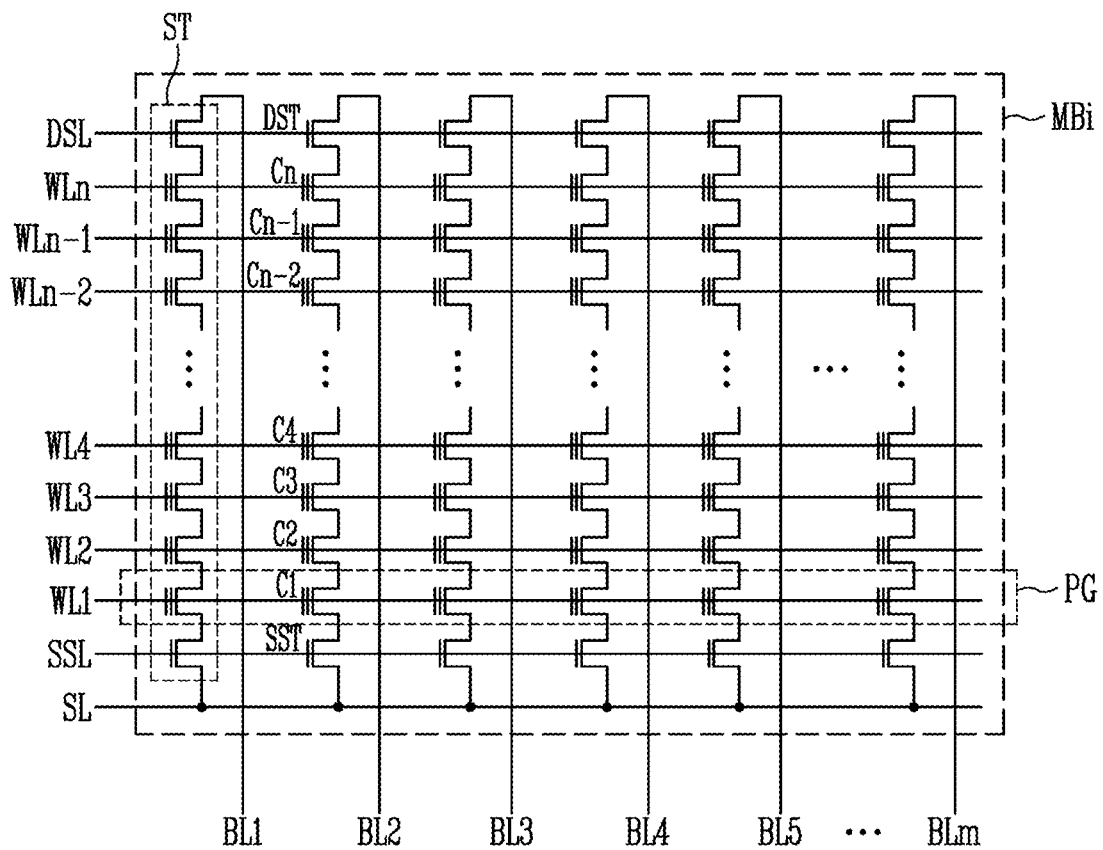

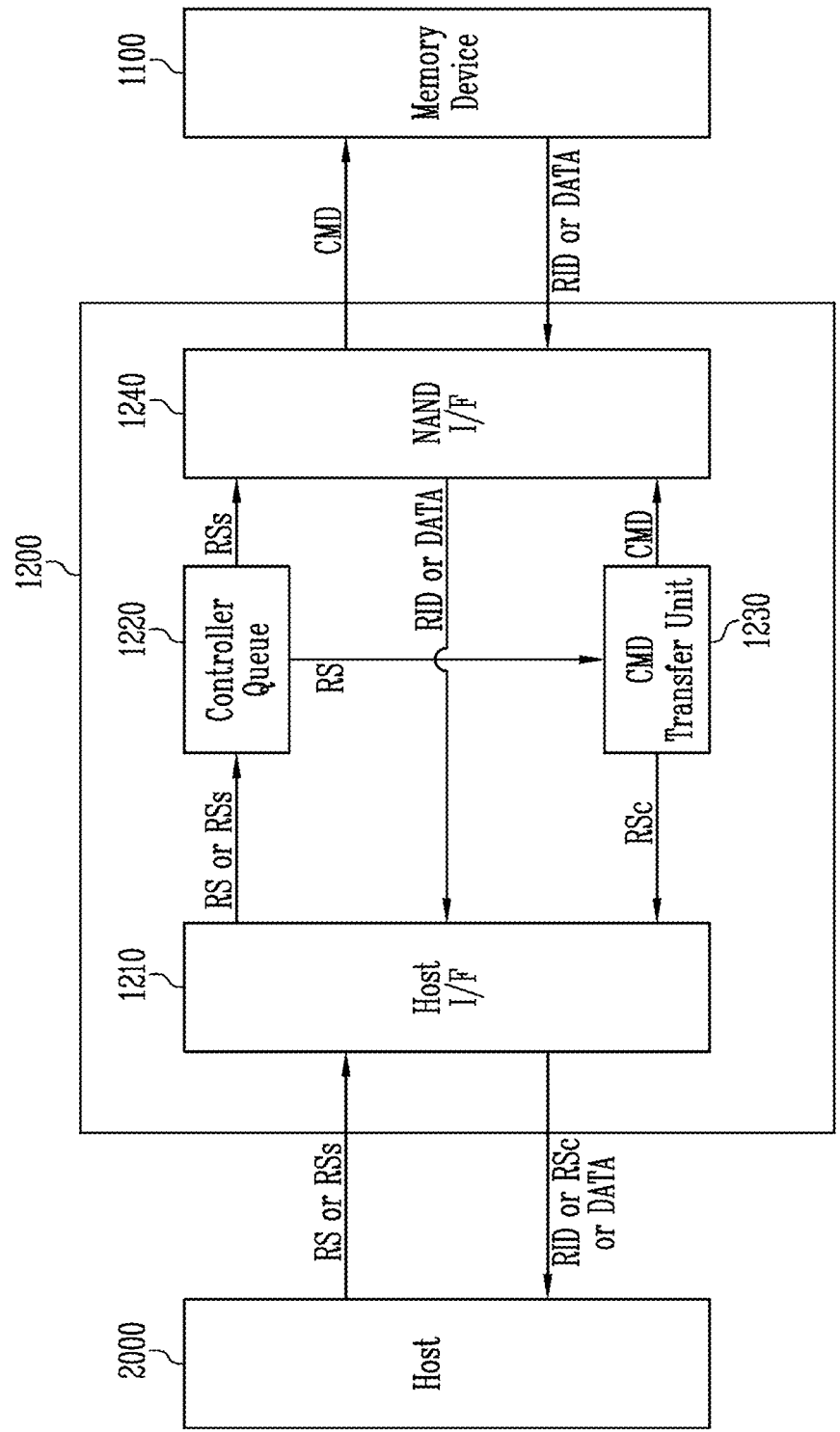

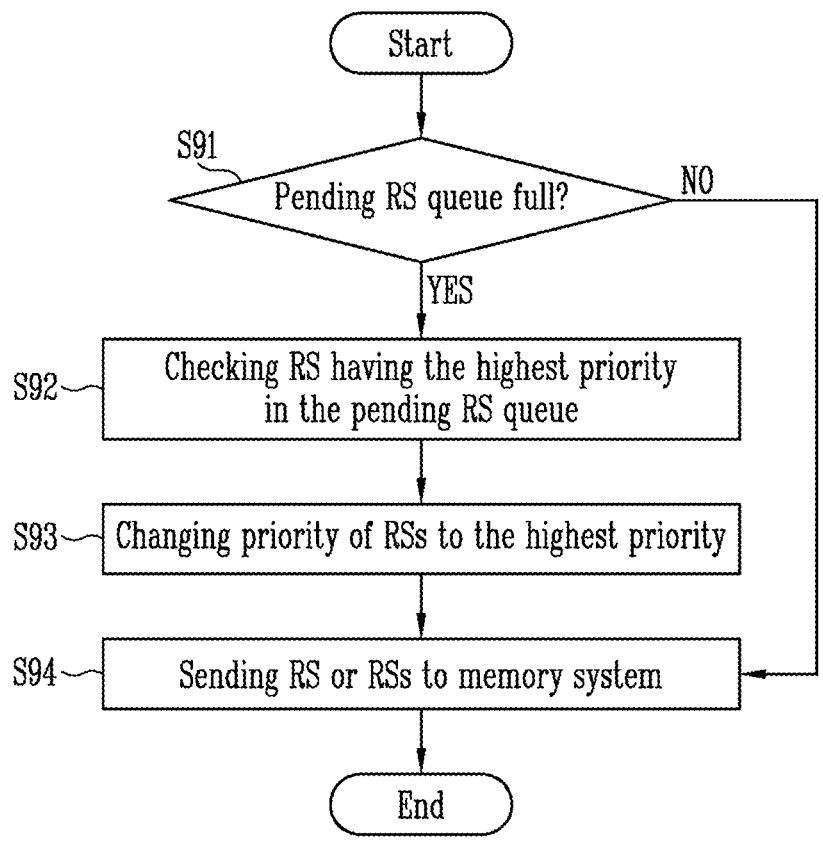

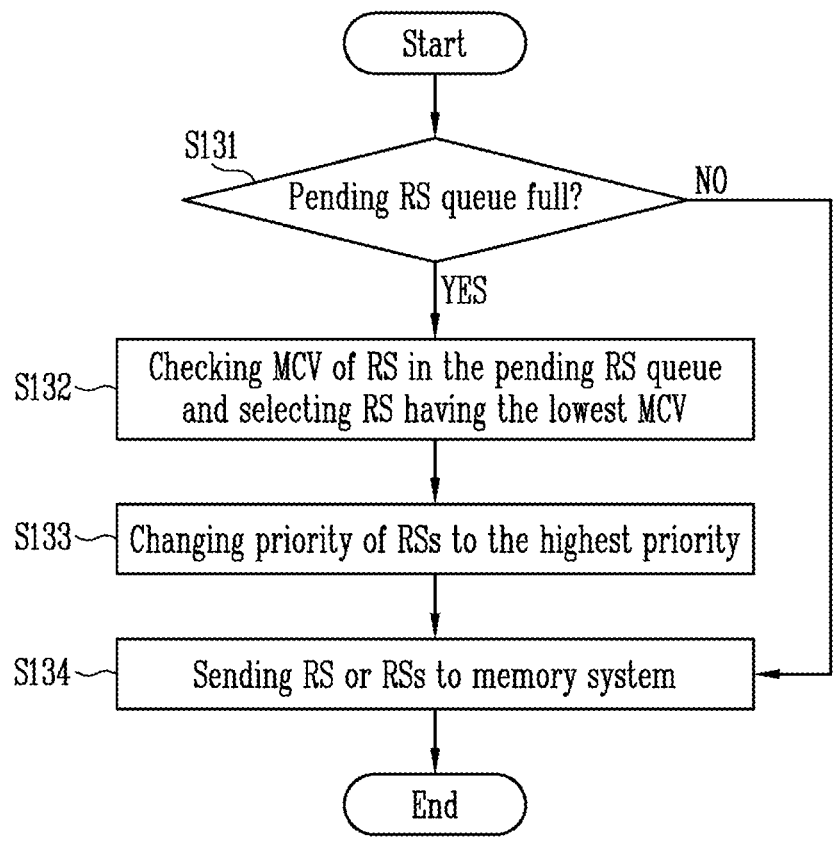

ELECTRONIC SYSTEM HAVING MEMORY SYSTEM AND HOST FOR MANAGING REQUEST SET QUEUE

CROSS-REFERENCE TO RELATED APPLICATION

The present application is a continuation of U.S. patent application Ser. No. 16/999,953 filed Aug. 21, 2020, which claims priority under 35 U.S.C. § 119(a) to Korean patent application number 10-2020-0031537, filed on Mar. 13, 2020, in the Korean Intellectual Property Office, the entire disclosure of which is incorporated herein by reference.

BACKGROUND

Field of Invention

The present disclosure generally relates to an electronic system, and more particularly, to an electronic system having a host and a memory system and capable of managing a queue of a request.

Description of Related Art

An electronic system may include a memory system which stores data and a host which transmits program, read, and erase requests to the memory system.

The memory system may include a memory device capable of storing data and a controller capable of controlling the memory device.

The memory device in the memory system may include a plurality of memory chips. Each of the memory chips may include a memory cell array in which data is stored, peripheral circuits capable of performing a program, read, or erase operation on the memory cell array, and a logic circuit capable of controlling the peripheral circuits in response to a command and an address.

The controller in the memory system may control data communication between the host and the memory device. The controller may generate and output a command for controlling the memory device in response to a request of the host. For example, the controller may control the memory device such that received data is programmed to the memory device, in response to a program request. The controller may read out data stored in a storage area mapped to a received address and output read data to the host, in response to a read request. The controller may erase data stored in a storage area mapped to a received address, in response to an erase request.

The host may communicate with the memory device through the controller by using an interface protocol such as Peripheral Component Interconnect-Express (PCI-E), Advanced Technology Attachment (ATA), Serial ATA (SATA), Parallel ATA (PATA), Serial Attached SCSI (SAS), or the like. Interface protocols between the host and the memory system are not limited to the above-described examples, and may further include various interfaces such as a Universal Serial Bus (USB), a Multi-Media Card (MMC), an Enhanced Small Disk Interface (ESDI), Integrated Drive Electronics (IDE), and so on.

SUMMARY

Embodiments provide an electronic system having a host and a memory system. The host can process request sets by changing priorities of the request sets when a storage storing pending request sets is full.

In accordance with an aspect of the present disclosure, there is provided a host including: a request merge manager configured to generate one or more operation request sets using addresses and requests, the request merger manager generating an operation request set by merging requests corresponding to addresses that are continuous; a first request set queue configured to store one or more of transmission request sets and operation request sets, and sequentially output the operation request sets and the transmission request sets to a memory system according to priorities of the operation request sets and the transmission request sets, an operation request set for requesting the memory system to perform a corresponding operation, a transmission request set for requesting the memory system to transmit data read out by a corresponding operation; a first scheduler configured to control the priorities of the operation request sets and the transmission request sets stored in the first request set queue; a second request set queue configured to store the operation request sets sequentially output from the first request set queue until an operation of each of the operation request sets is completed in a memory system; a second scheduler configured to generate a transmission request set in response to a read ID of each of the operation request sets output to the memory system, and transmit the transmission request set to the first request set queue; and a request set detector configured to transmit, to the first scheduler, request information on a request set having a highest priority among the operation request sets stored in the second request set queue, when the second request set queue is full, wherein the first scheduler changes a priority of a transmission request set corresponding to the request information among the transmission request sets stored in the first request set queue to become a highest priority in the first request set queue.

In accordance with another aspect of the present disclosure, there is provided an electronic system including: a memory system configured to store data; and a host configured to output request sets queued in a first request set queue to the memory system, and include a second request set queue which stores the request sets while an operation corresponding to each of the request sets is performed in the memory system, wherein, when the second request set queue is full, the host changes a priority of a transmission request set queued in the first request set queue to become a highest priority in the first request set queue, the transmission request set for requesting the memory system to transmit data read out by a corresponding operation.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 3 is a diagram illustrating a memory block.

FIG. 4 is a diagram illustrating a storage capacity and a logical address of a memory device.

FIG. 8 is a diagram illustrating a controller in accordance with an embodiment of the present disclosure.

FIG. 9 is a flowchart illustrating a request set management method in accordance with a first embodiment of the present disclosure.

FIG. 13 is a flowchart illustrating a request set management method in accordance with a second embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
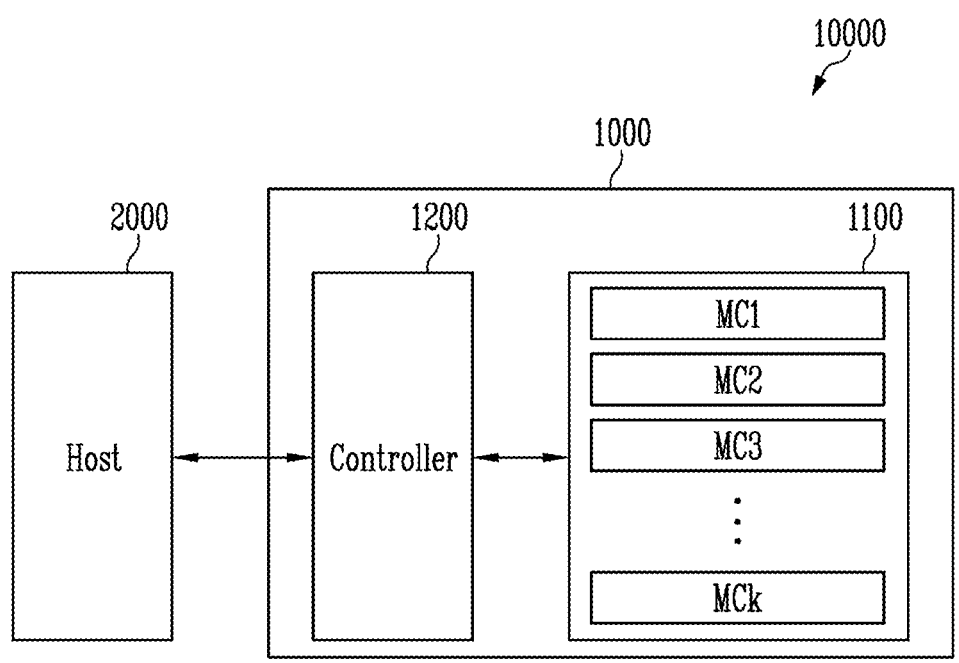
FIG. 1 is a diagram illustrating an electronic system in accordance with an embodiment of the present disclosure.

FIG. 1 is a diagram illustrating an electronic system 10000 in accordance with an embodiment of the present disclosure.

Referring to FIG. 1, the electronic system 10000 may include a memory system 1000 capable of storing data and a host 2000 configured to output, to the memory system 1000, a request for allowing the memory system 1000 to program, read, or erase data.

The memory system 1000 may include a memory device 1100 configured to store data and a controller 1200 configured to control communications between the memory device 1100 and the host 2000. The memory device 1100 may include a plurality of memory chips MC1 to MCk (k is a positive integer). The memory chips MC1 to MCk may be implemented with a nonvolatile memory or a volatile memory. In this embodiment, the memory chips MC1 to MCk implemented with the nonvolatile memory are illustrated. However, embodiments are not limited to the nonvolatile memory. The memory chips MC1 to MCk may communicate with the controller 1200 through a channel. For example, the plurality of memory chips MC1 to MCk may be coupled to one channel. In another example, a plurality of channels are coupled to the controller 1200, and the plurality of memory chips may be coupled to the plurality of channels.

The controller 1200 may control communications between the host 2000 and the memory device 1100. When the controller 1200 receives a request set from the host 2000, the controller 1200 may generate a command based on the received request set, and transmit the generated command to the memory device 1100. For example, in a read operation, the controller 1200 may generate a read command based on a read request set, and transmit, to the memory device 1100, a physical address mapped to a logical address included in the read request set together with the read command. Also, when the memory controller 1200 is ready for outputting read data according to the read request set, the controller 1200 may output, to the host 2000, a read identification (read ID) including read information on the memory device 1100. Also, when the controller 1200 receives a transmission request set from the host 2000, the controller 1200 may output, to the host 2000, data read from the memory device 1100 and a completion request set.

The host 2000 may sequentially queue requests for various operations, and transmit the requests to the memory system 1000 according to the queued order. For example, a request output from the host 2000 may be transmitted to the controller 1200 of the memory system 1000.

When the host 2000 transmits a read request set to the memory system 1000 in a read operation, the memory system 1000 may perform the read operation in response to the read request set.

When the host 2000 receives a read ID from the memory system 1000, the host 2000 may search for a read request set corresponding to the read ID, generate a transmission request set to receive data corresponding to the searched read request set, and output the generated transmission request set to the memory system 1000. Also, when the host 2000 receives a completion request set from the memory system 1000, the host 2000 may remove a request set corresponding to the completion request set from a queue, and be ready for outputting a next request to the memory system 1000.

This embodiment introduces a technique for changing priorities of request sets, such that the request sets can be processed according to the changed priorities, when the output of the next request set to the memory system 1000 is blocked in the host 2000.

Figure 2:
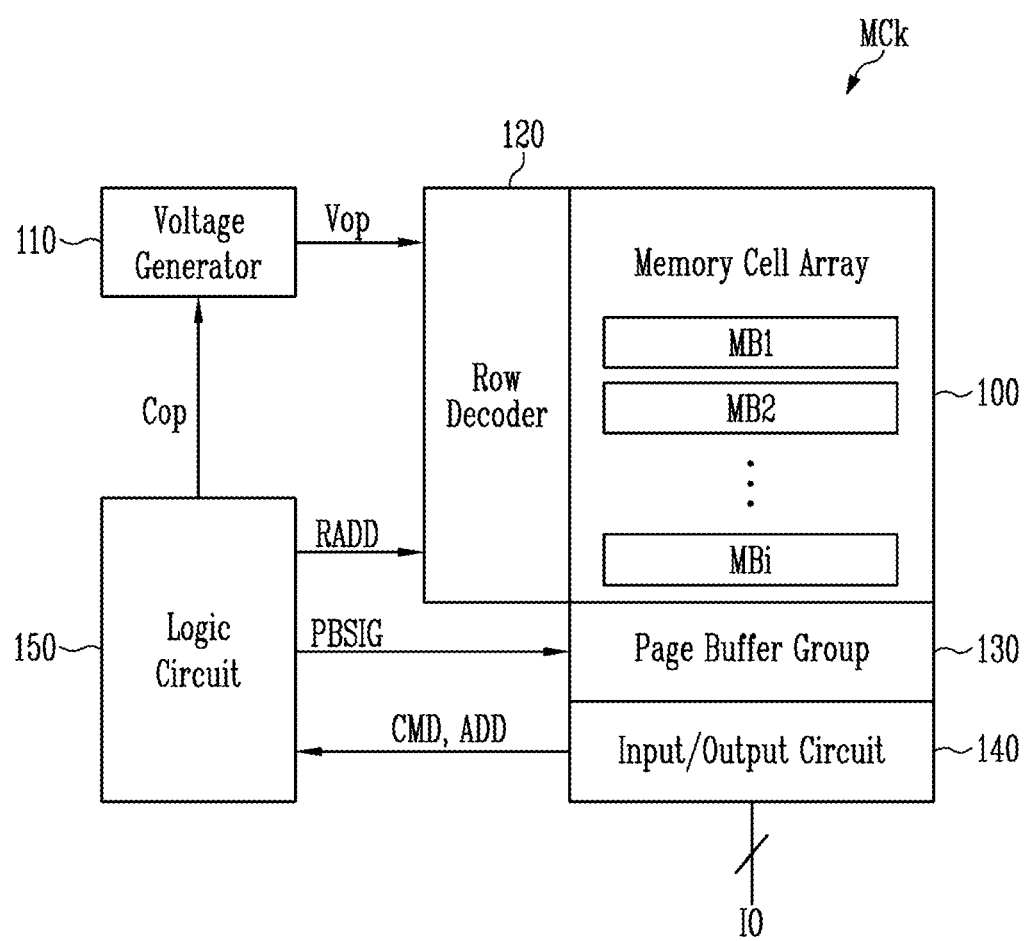
FIG. 2 is a diagram illustrating a memory chip.

FIG. 2 is a diagram illustrating a memory chip. The memory chips MC1 to MCk shown in FIG. 1 are configured identically to one another, and therefore, FIG. 2 illustrates the memory chip MCk among the memory chips MC1 to MCk as an example.

Referring to FIG. 2, the memory chip MCk may include a memory cell array 100 configured to store data, peripheral circuits 110 to 140 configured to perform a program, read, or erase operation, and a logic circuit 150 configured to control the peripheral circuits 110 to 140.

The memory cell array 100 may include a plurality of memory blocks MB1 to MBi (i is a positive integer) in which data is stored. Each of the memory blocks MB1 to MBi may include a plurality of memory cells, and the memory cells may be implemented in a two-dimensional structure in which the memory cells are arranged in a direction parallel to a top surface of a substrate or a three-dimensional structure in which the memory cells are stacked in a direction perpendicular to the top surface of the substrate. The use of a memory block having a three-dimensional structure, which has an excellent degree of integration, has recently been increased. However, embodiments are not limited thereto.

The peripheral circuits 110 to 140 may include a voltage generator 110, a row decoder 120, a page buffer group 130, and an input/output circuit 140.

The voltage generator 110 may generate and output operating voltages Vop necessary for performing various operations in response to an operation code Cop. For example, the voltage generator 110 may generate a program voltage, a verify voltage, a read voltage, a pass voltage, an erase voltage, and the like.

The row decoder 120 may select at least one memory block among the memory blocks MB1 to MBi included in the memory cell array 100 according to a row address RADD, and transmit the operating voltage Vop to the selected memory block.

The page buffer group 130 may be coupled to the memory cell array 100 through bit lines. For example, the page buffer group 130 may include page buffers respectively coupled to the bit lines. The page buffers may simultaneously operate in response to page buffer control signals PBSIGS, and temporarily store data in a program or read operation. To this end, each of the page buffers may include a latch for temporarily storing data.

The input/output circuit 140 may be coupled to an external device, e.g., the controller 1200 of FIG. 1, through input/output lines IO. The input/output circuit 140 may input/output a command CMD, an address ADD, and data DATA through the input/output lines IO. For example, the input/output circuit 140 may receive a command CMD and an address ADD through the input/output lines IO, transmit the received command CMD and the received address ADD to the logic circuit 150, and transmit data DATA received through the input/output lines IO to the page buffer group 130. Also, the input/output circuit 140 may output data DATA received from the page buffer group 130 to the external device, e.g., the controller 1200, through the input/output lines IO.

The logic circuit 150 may output the operation code Cop, the row address RADD, and the page buffer control signals PBSIGS based on the command CMD and the address ADD. The logic circuit 150 may include software for performing various algorithms according to the command CMD and hardware for outputting various codes or signals according to an algorithm executed by the software.

FIG. 3 is a diagram illustrating a memory block MBi.

Referring to FIG. 3, the memory block MBi may include a plurality of strings ST coupled between first to mth bit lines BL1 to BLm (m is a positive integer) and a source line SL. Each of the strings ST may include a source select transistor SST, first to nth memory cells C1 to Cn (n is a positive integer), and a drain select transistor DST, which are coupled in series between the source line SL and a corresponding one of the first to mth bit lines BL1 to BLm. The memory block MBi shown in FIG. 3 is an exemplary configuration of a memory block in which data is stored, and therefore, the numbers of the source select transistor SST, the first to nth memory cells C1 to Cn, and the drain select transistor DST are not limited to those shown in FIG. 3.

Gates of the source select transistors SST included in different strings ST may be coupled to a source select line SSL, gates of the first to nth memory cells C1 to Cn included in different strings ST may be respectively coupled to first to nth word lines WL1 to WLn, and gates of the drain select transistors DST included in different strings ST may be coupled to a drain select line DSL.

Memory cells coupled to the same word line and included in different strings ST may constitute one page PG. The memory cells may be programmed or read in a unit of a page PG.

The first to mth bit lines BL1 to BLm may be respectively coupled to the page buffers included in the page buffer group 130 of FIG. 2.

FIG. 4 is a diagram illustrating a storage capacity and a logical address of the memory device 1100 of FIG. 1.

Referring to FIG. 4, the memory device 1100 includes a plurality of memory chips MC1 to MCk as shown in FIG. 1, which are physically divided, but the total storage capacity of the memory device 1100 may be logically divided into a plurality of storage areas. A logical address LADD may be given to each of the storage areas which are logically divided. The logical address LADD may be used in the host 2000 shown in FIG. 1. For example, the host 2000 may manage addresses in a unit of a logical address, and addresses may be given in a unit of a physical address in the memory device 1100. The physical address may correspond to addresses of the memory chips MC1 to MCk included in the memory device 1100 and the memory bocks MB1 to MBi included in each memory chip. The controller 1200 shown in FIG. 1 may manage a relationship between logical addresses LADD and physical addresses.

When the host 2000 manages the memory device 1100 in a unit of a logical address LADD, storage capacities of storage areas corresponding to logical addresses LADD may be set equal to each other. For example, a storage capacity of a storage area of which logical address LADD is a00 and a storage capacity of a storage area of which logical address LADD is a01 may be equal to each other.

Figure 5:
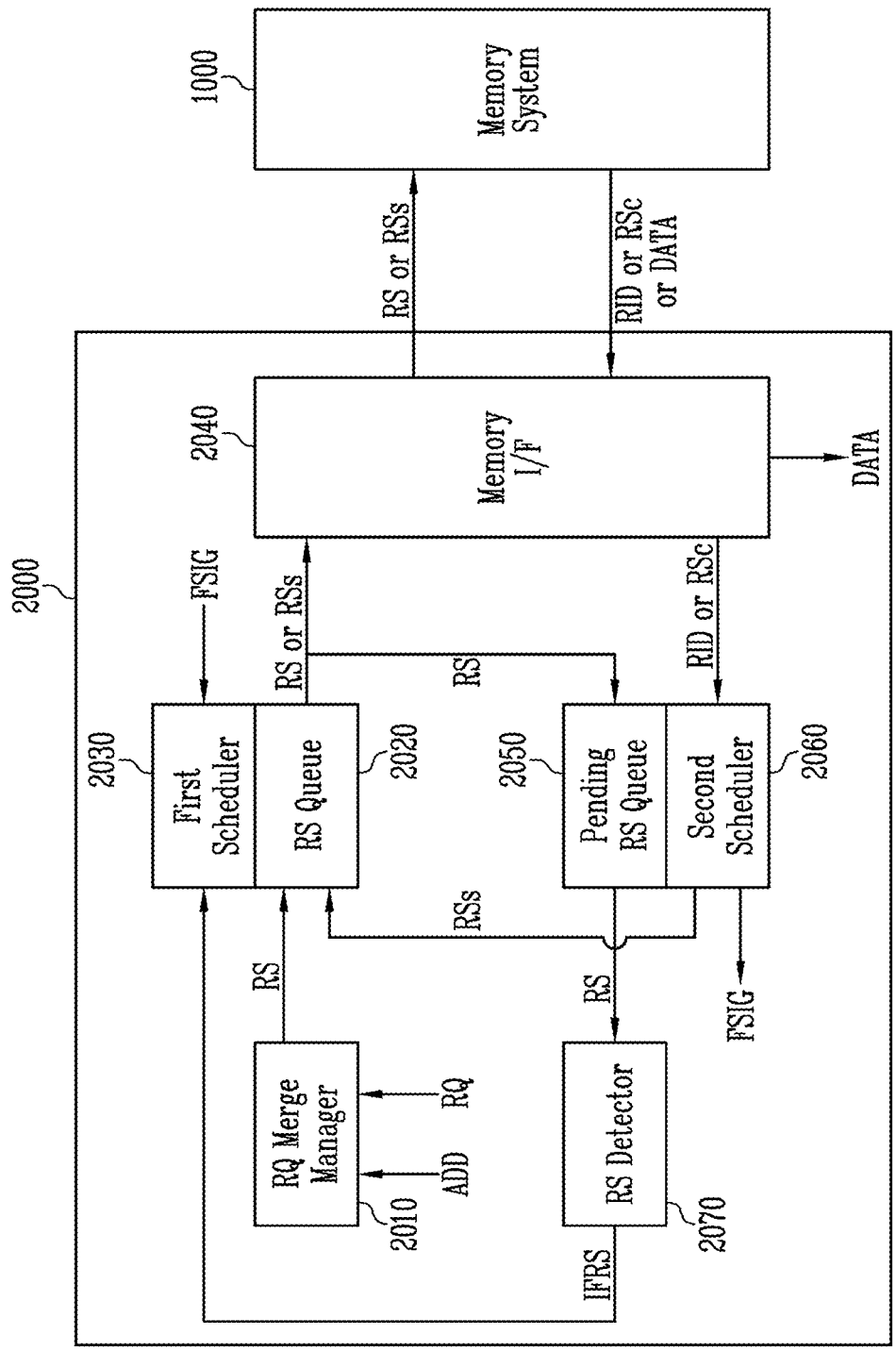
FIG. 5 is a diagram illustrating a host in accordance with an embodiment of the present disclosure.

FIG. 5 is a diagram illustrating the host 2000 of FIG. 1 in accordance with an embodiment of the present disclosure.

Referring to FIG. 5, the host 2000 may include a request (RQ) merge manager 2010, a request set (RS) queue 2020, a first scheduler 2030, a memory interface (I/F) 2040, a pending RS queue 2050, a second scheduler 2060, and an RS detector 2070.

In an embodiment, the RQ merge manager 2010, the first scheduler 2030, the second scheduler 2060, and the RS detector 2070 may be implemented with one or more processors (not shown), and the RS queue 2020 and the pending RS queue 2050 may be implemented with one or more memories, buffers, registers, or the like included in the host 2000.

When addresses ADD and requests RQ are generated, the RQ merge manager 2010 may selectively merge the requests RQ according to the addresses ADD. The addresses ADD may be logical addresses, and the requests RQ may be requests for performing program, read, or erase operations.

When the addresses ADD received together with the requests RQ are continuous, the RQ merge manager 2010 may merge, as one request, the requests RQ respectively corresponding to the continuous addresses ADD.

For example, when requests RQ are for a read operation and addresses ADD respectively corresponding to the requests RQ are continuous, the RQ merge manager 2010 may merge, as one request, the requests RQ for the read operation, and map the addresses ADD to a request set for the merged request. On the other hand, the received requests RQ are not merged when the requests RQ are for different operations even though the received addresses ADD are continuous. The RQ merge manager 2010 may generate an operation request set RS in which the requests RQ are merged and to which the continuous addresses ADD are mapped, and transmit the generated operation request set RS to the RS queue 2020. When the requests RQ are merged in the operation request set RS, the RQ merge manager 2010 may generate and output the operation request set RS to the RS queue 2020. Hereinafter, an operation request set RS may be simply called a "request set RS."

When the addresses ADD received together with the requests RQ are discontinuous, the RQ merge manager 2010 does not merge the requests RQ, and may generate a request set RS by respectively mapping each of the received requests RQ to a corresponding one of the received addresses ADD. That is, one request set RS may be generated by mapping one address ADD to one request RQ.

The RS queue 2020 may include a storage capable of storing a request set RS output from the RQ merge manager 2010 or a transmission request set RSs output from the second scheduler 2060. For example, the storage included in the RS queue 2020 may be configured with a volatile memory device or a non-volatile memory device. For example, the storage included in the RS queue 2020 may be implemented with a dynamic random access memory (DRAM), a static random access memory (SRAM), a latch, or the like. The storage included in the RS queue 2020 may include a plurality of storage areas, and a priority may be given to each of the plurality of storage areas. The priorities of the plurality of storage areas may determine an order of outputting request sets queued in the plurality of storage areas of the RS queue 2020.

A capacity of a storage included in the RS queue 2020 may be equal to that of a storage included in a pending RS queue 2050.

The first scheduler 2030 may manage the RS queue 2020. The first scheduler 2030 may change priorities of the transmission request set RSs and the request set RS, which are queued in the RS queue 2020, in response to a full signal FSIG and request information IFRS. For example, when the full signal FSIG is inactivated, the first scheduler 2030 may queue the request set RS and the transmission request set RSs in an order in which the request set RS and the transmission request set RSs are input to the RS queue 2020, and sequentially output the request set RS and the transmission request set RSs in the order in which the request set RS and the transmission request set RSs are queued in the RS queue 2020. On the other hand, when the full signal FSIG is activated, the first scheduler 2030 may change priorities of the request set RS and the transmission request set RSs queued in the RS queue 2020 according to the request information IFRS.

For example, the first scheduler 2030 may change priorities of a plurality of request sets RS queued in the RS queue 2020, and the RS queue 2020 may sequentially output the plurality of request sets RS according to the changed priorities. Also, when the first scheduler 2030 outputs a request set RS queued in the RS queue 2020, the first scheduler 230 may simultaneously output the request set RS to the memory I/F 2040 and the pending RS queue 2050. When the first scheduler 2030 outputs a transmission request set RSs queued in the RS queue 2020, the first scheduler 2030 may output the transmission request set RSs to only the memory I/F 2040.

In a method for changing a priority of a request set, a priority given to a storage area in which the request set is stored in the RS queue 2020 may be changed, or the priority of the request set may be changed by moving the request set to another storage area having a different priority from the storage area in which the request set is currently stored. In an embodiment, when a request set is moved to another storage area, the RS queue 2020 may further include an extra storage area in addition to storage areas in which request sets queued in the RS queue 2020 are stored.

When the request set RS or the transmission request set RSs are received from the RS queue 2020, the memory I/F 2040 may output the received request set to the memory system 1000 according to an address of the received request set. Also, when a read ID RID, a completion request set RSc, or data DATA is received from the memory system 1000, the memory I/F 2040 may transfer, the received read ID RID, the received completion request set RSc, or the received data DATA to internal components of the host 2000. For example, the memory I/F 2040 may transfer the read ID RID or the completion request set RSc to the second scheduler 2060.

The pending RS queue 2050 may include a storage capable of sequentially storing request sets RS received from the RS queue 2020. The storage included in the pending RS queue 2050 may be configured with a volatile memory device or a nonvolatile memory device. For example, the storage included in the pending RS queue 2050 may be implemented with a dynamic random access memory (DRAM), a static random access memory (SRAM), a latch, or the like. A capacity of the storage included in the pending RS queue 2050 may be equal to that of the storage included in the RS queue 2020.

The second scheduler 2060 may manage the pending RS queue 2050. The second scheduler 2060 may check whether the pending RS queue 2050 is fully filled with request sets RS. When it is determined that the pending RS queue 2050 is fully filled, the second scheduler 2060 may activate the full signal FSIG. When it is determined that the pending RS queue 250 is not fully filled, the second scheduler 2060 may inactivate the full signal FSIG. When the full signal FSIG is activated, the first scheduler 2030 may change priorities of request sets queued in the RS queue 2020 according to the request information IFRS.

Also, when the read ID RID or the completion request set RSc is received from the memory I/F 2040, the second scheduler 2060 may search for a request set corresponding to the read ID RID or the completion request set RSc among request sets RS stored in the pending RS queue 2050. When the second scheduler 2060 finds the request set corresponding to the read ID RID, the second scheduler 2060 may generate a transmission request set RSs corresponding to the searched request set and then transmit the generated transmission request set RSs to the RS queue 2020. When the second scheduler 2060 finds the request set corresponding to the completion request set RSc, the second scheduler 2060 may remove the searched request set from the pending RS queue 2050.

When the pending RS queue 2050 is fully filled with request sets RS, the RS detector 2070 may receive information of a request set RS having the highest priority among the request sets RS stored in the pending RS queue 2050, and output, to the first scheduler 2030, information on the request set RS having the highest priority as the request information IFRS. Alternatively, when the pending RS queue 2050 is fully filled with request sets RS, the RS detector 2070 may sequentially output, to the first scheduler 2030, information on the request sets RS queued in the pending RS queue 2050 according to priorities and merge count values of the request sets RS, as the request information IFRS.

Main components among the above-described components in the host 2000 will be described in detail hereinafter.

Figure 6:
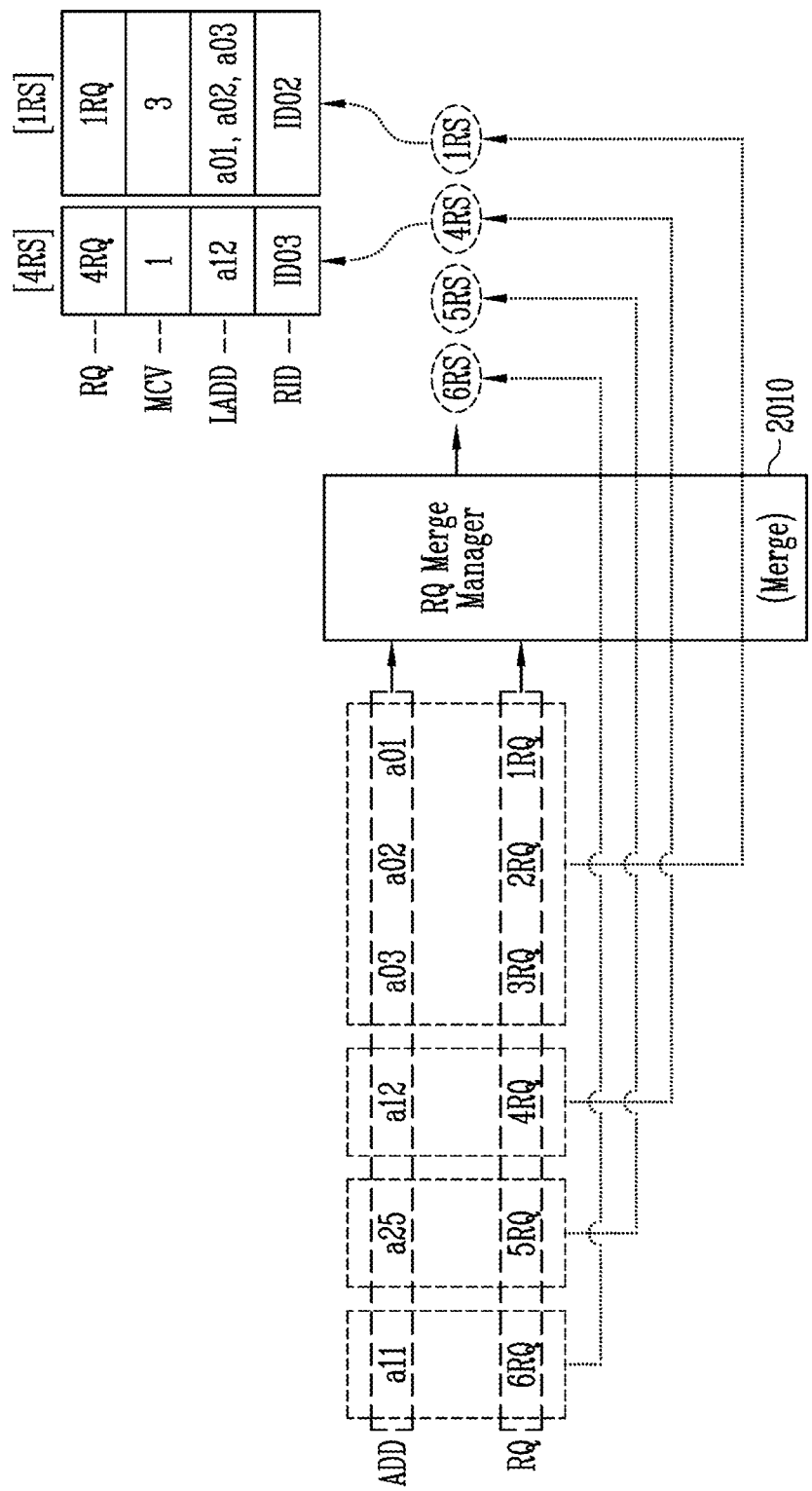
FIG. 6 is a diagram illustrating a request merge manager and a method for merging requests.

FIG. 6 is a diagram illustrating the RQ merge manager 2010 of FIG. 5 and a method for merging requests.

Referring to FIG. 6, with regard to a target operation, e.g., a read operation, the RQ merge manager 2010 may receive addresses ADD and requests RQ, which are generated in the host 2000, and merge, as one request, requests corresponding continuous addresses ADD. For example, when first to sixth requests 1RQ to 6RQ and addresses ADD respectively mapped to the respective requests 1RQ to 6RQ are sequentially input and addresses ADD mapped to the first to third requests 1RQ to 3RQ are continuous addresses, e.g., a01 to a03, the first to third requests 1RQ to 3RQ and the continuous addresses a01 to a03 may be included in a first request set 1RS. On the other hand, since the other addresses a12, a25, and a11 are not continuous addresses, the fourth to sixth requests 4RQ to 6RQ and the addresses a12, a25, and a11 respectively mapped to the fourth to sixth requests 4RQ to 6RQ are respectively included in a fourth request set 4RS, a fifth request set 5RS, and a sixth request set 6RS.

A request set generated in the RQ merge manager 2010 may include a request RQ, a merge count value MCV, a logical address LADD, and a read ID RID. The request RQ may be a request generated in the host 2000, and include a program request, a read request, or an erase request respectively for performing a program operation, a read operation, or an erase operation. The merge count value MCV may be the number of requests merged as one request. For example, since the three requests 1RQ to 3RQ are merged in the first request set 1RS, the merge count value MCV of the first request set 1RS may be 3. When only one request 4RQ is included in the fourth request set 4RS, without merging requests, the merge count value MCV of the fourth request set 4RS may be 1. Therefore, a request set in which a merge count value MCV is two or more may become a request set in which two or more requests are merged.

The first request set 1RS in which the first to third requests 1RQ to 3RQ are merged will be described hereinafter as an example. Although the first request set 1RS includes one request, i.e., the first request 1RQ, the merge count value MCV is 3, and thus it can be seen that three requests has been merged. The three addresses a01, a02, and a03 corresponding to the merged request 1RQ may be included in the logical address LADD of the first request set 1RS, and the read ID RID corresponding to the first request set 1RS may include ID02. The read ID RID may include various information on the memory device 1100 in which read data is stored. For example, the read ID RID may include information related to manufacturing of the memory device 1100, and include at least one of an address and an identification symbol of a memory chip in which the read data is stored. When a plurality of requests for the read operation are merged as one request, a larger number of requests can be stored in the RS queue 2020 in which request sets are stored, and thus a larger number of requests can be executed by using a limited storage area of the RS queue 2020.

Figure 7:
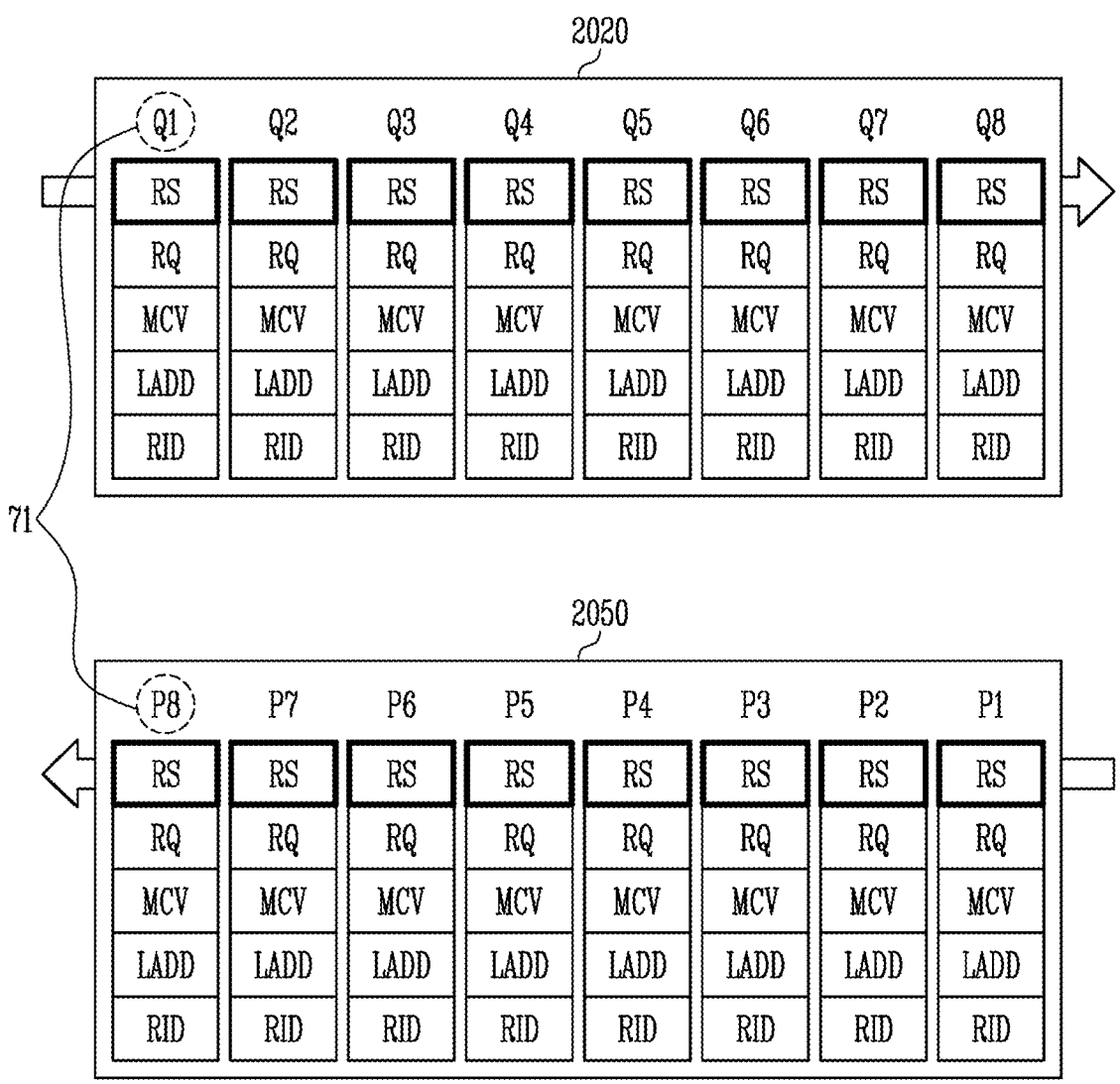
FIG. 7 is a diagram illustrating a request set queue and a pending request set queue.

FIG. 7 is a diagram illustrating the RS queue 2020 and the pending RS queue 2050 of FIG. 5.

Referring to FIG. 7, the RS queue 2020 may store request sets RS which are to be output to the memory system 1000, and the pending RS queue 2050 may store request sets RS which have been output to the memory system 1000 and whose operations are still being performed in the memory system 1000.

The RS queue 2020 and the pending RS queue 2050 may have the same storage capacity. For example, when first to eighth storage areas Q1 to Q8 are included in the RS queue 2020, the pending RS queue 2050 may also include first to eighth storage areas P1 to P8. A request RQ, a merge count value MCV, a logical address LADD, and a read ID RID, which are included in a request set RS, may be stored in each of the first to eighth storage areas Q1 to Q8 of the RS queue 2020 and the first to eighth storage areas P1 to P8 of the pending RS queue 2050. The request RQ may be configured with a code corresponding to one of various operations. The merge count value MCV may represent the number of requests merged as one request. For example, a request set RS of which merge count value MCV is 1 represents a request set RS in which any request RQ is not merged, and a request set RS of which merge count value MCV is 2 or more represents a request set RS in which 2 or more requests RQ are merged as one request RQ. The logical address LADD is an address mapped to the request RQ. For example, in the case of a request set RS in which a plurality of requests RQ are merged, the logical address LADD may include a plurality of logical addresses respectively mapped to the plurality of requests RQ, the plurality of logical addresses being continuous. The read ID RID may be information about the memory device 1100 corresponding to the logical address LADD.

Request sets RS respectively input to the RS queue 2020 and the pending RS queue 2050 may be stored in the first to eighth storage areas Q1 to Q8 and P1 to P8 in an order in which the request sets RS are input thereto. For example, when a plurality of request sets RS are sequentially input to the first to eighth storage areas Q1 to Q8 of the RS queue 2020 that are empty, a first one of the request sets RS may be preferentially stored in the eighth storage area Q8, and a second one of the request sets RS may be stored in the seventh storage area Q7. In this manner, the request sets RS may be sequentially stored in the eighth storage area Q8 to the first storage area Q1. When a plurality of request sets RS are input to the pending RS queue 2050, a first one of the request sets RS may be preferentially stored in the eighth storage area P8, and a second one of the request sets RS may be stored in the seventh storage area P7. In this manner, the request sets RS may be sequentially stored in the eight storage area P8 to the first storage area P1.

The request set RS stored in the eighth storage area Q8 among the request sets RS stored in the RS queue 2020 may be first output. When the request set RS stored in the eighth storage area Q8 is output, the request sets RS stored in the seventh to first storage areas Q7 to Q1 may be respectively moved to the eighth to second storage areas Q8 to Q2, and the first storage area Q1 may be empty. Therefore, when the first to eighth storage areas Q1 to Q8 are fully filled with the request sets RS, the first storage area Q1 is empty only when the request set RS stored in the eighth storage area Q8 is output. Accordingly, a next request set RS may be input to the first storage area Q1. Since the RS queue 2020 stores request sets RS to be output to the memory system 1000, a transmission request set for outputting read data may be stored in the RS queue 2020 in addition to a program request set, a read request set, or an erase request set.

Like the RS queue 2020, in the pending RS queue 2050, when the first to eighth storage areas P1 to P8 are fully filled with request sets RS, the first storage area P1 may be empty only when the request set RS stored in the eighth storage area P8 is output. Accordingly, a next request set RS may be input to the first storage area P1 when the first storage area P1 is empty. Since the pending RS queue 2050 stores a request set being executed in the memory system 1000, a program request set, a read request set, or an erase request set may be stored.

Therefore, each number 71 of the first to eighth storage areas Q1 to Q8 and P1 to P8 in the RS queue 2020 and the pending RS queue 2050 may represent a priority of a request set RS stored in each storage area and the request set RS stored in each storage area is output according to the priority. That is, a request set RS stored in a storage area having a larger number, i.e., a higher priority, can be output prior to a request set RS stored in a storage area having a smaller number, i.e., a lower priority.

FIG. 8 is a diagram illustrating the controller 1200 of FIG. 1 in accordance with an embodiment of the present disclosure.

Referring to FIG. 8, the controller 1200 may include a host I/F 1210, a controller queue 1220, a command (CMD) transfer unit 1230, and a NAND I/F 1240. In an embodiment, the controller queue 1220 and the CMD transfer unit 1230 may be implemented using a memory or register (not shown) and one or more processors (not shown) included in the controller 1200.

The host I/F 1210 may transmit a request set RS, a transmission request set RSs, a read ID RID, a completion request set RSc, or data DATA between the controller 1200 and the host 2000. When the host I/F 1210 receives a request set RS or a transmission request set RSs from the host 2000, the host I/F 1210 may transmit the received request set RS or the received transmission request set RSs to the controller queue 1220. When the host I/F 1210 receives a read ID RID, data DATA, or a completion request set RSc, the host I/F 1210 may output the received read ID RID, the received data DATA, or the received completion request set RSc to the host 2000. For example, when the host I/F 1210 receives a read ID RID from the NAND I/F 1240, the host I/F 1210 may output the received read ID RID to the host 2000. When the host I/F 1210 receives data DATA from the NAND I/F 1240, the host I/F 1210 may output the data DATA together with a completion request set RSc to the host 2000. The controller queue 1220 may sequentially queue a request set RS or a transmission request set RSs received from the host I/F 1210. The controller queue 1220 may transmit the queued request set RS to the CMD transfer unit 1230, and output the queued transmission request set RSs to the NAND I/F 1240.

When the request set RS is transmitted from the controller queue 1220, the CMD transfer unit 1230 may convert the request set RS into a corresponding command CMD, and transmit the command CMD to the NAND I/F 1240. In addition, the CMD transfer unit 1230 may transmit a completion request set RSc to the host I/F 1210.

The NAND I/F 1240 may transmit a transmission request set RSs, a command CMD, a read ID RID, or data DATA between the controller 1200 and the memory device 1100. For example, when the NAND I/F 1240 receives a read ID RID from the memory device 1100, the NAND I/F 1240 may transmit the read ID RID to the host I/F 1210. When the NAND I/F 1240 receives a transmission request set RSs from the controller queue 1220, the NAND I/F 1240 may transmit data DATA received from the memory device 1100 to the host I/F 1210. Also, the NAND I/F 1240 may transmit a command CMD received from the CMD transfer unit 1230 to the memory device 1100.

FIG. 9 is a flowchart illustrating a request set management method in accordance with a first embodiment of the present disclosure. The method illustrated in FIG. 9 will be described with reference to FIG. 5.

Referring to FIGS. 5 and 9, the second scheduler 2060 may check whether the storage areas of the pending RS queue 2050 are fully filled with requests sets RS at S91. For example, when it is determined that the storage areas of the pending RS queue 2050 are not fully filled, the second scheduler 2060 may inactivate the full signal FSIG. When it is determined that the storage areas of the pending RS queue 2050 are fully filled, the second scheduler 2060 may activate the full signal FSIG.

Since the second scheduler 2060 inactivates the full signal FSIG when an empty storage area exists in the pending RS queue 2050, the first scheduler 2030 may output a request set RS or a transmission request set RSs to the memory system 1000 in an order in which request sets RS and transmission request sets RSs are stored in the RS queue 2020 at S94.

At S91, when the storage areas of the pending RS queue 2050 are determined to be fully filled, the second scheduler 2060 activates the full signal FSIG. Therefore, the first scheduler 2030 may check a request set RS having the highest priority in the pending RS queue 2050 based on the request information IFRS at S92. Subsequently, the first scheduler 2030 may change a priority of a transmission request set RSs corresponding to the checked request set RS having the highest priority to become the highest priority in the RS queue 2020 at S93. For example, the first scheduler 2030 may change the priority of the transmission request set RSs corresponding to the request set RS checked at step S92, among the request sets RS and the transmission request sets RSs stored in the RS queue 2020, to become the highest priority. After that, the transmission request set RSs having the highest priority may be transmitted to the memory system 1000 at S94.

When a transmission request set RSs output from the RS queue 2020 is transmitted thereto, the memory system 1000 outputs read data DATA and a completion request set RSc to the host 2000, and therefore, a request set RS corresponding to the completion request set RSc among the request sets RS stored in the pending RS queue 2050 may be removed from the pending RS queue 2050.

The above-described request set management method illustrated in FIG. 9 will be described in more detail hereinafter.

FIGS. 10A to 10D are diagrams illustrating the method for changing priorities of request sets queued in the RS queue 2020 of FIG. 5 in accordance with the first embodiment of the present disclosure.

Figure 10A:
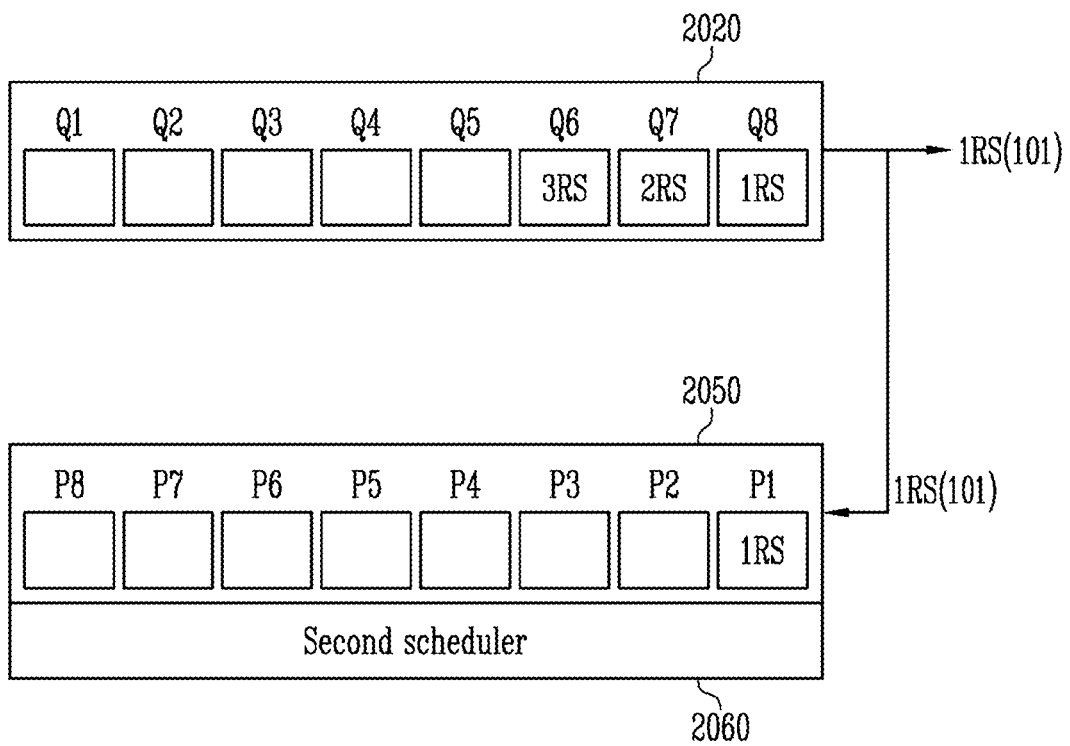
FIGS. 10A to 10D are diagrams illustrating a method for changing transmission priorities of request sets queued in a request set queue in accordance with the first embodiment of the present disclosure.

Referring to FIG. 10A, when the first to eighth storage areas Q1 to Q8 of the RS queue 2020 are not fully filled with request sets RS, i.e., when there is an empty storage area in the RS queue 2020, a request set RS or the transmission request sets RSs may be stored in a storage area having a higher priority in an order in which the request set RS and/or the transmission request sets RSs are input to the RS queue 2020. For example, when a first request set 1RS is input to the RS queue 2020 which is empty, the first request set 1RS may be stored in the eighth storage area Q8 having the highest priority among the first to eighth storage areas Q1 to Q8. When a second request set 2RS is input to follow the first request set 1RS, the second request set 2RS may be stored in the seventh storage area Q7 having the second highest priority. When a third request set 3RS is input to follow the second request set 2RS, the third request set 3RS may be stored in the sixth storage area Q6 having the third highest priority.

When the pending RS queue 2050 is empty, the first request set 1RS may be simultaneously stored in the first storage area P1 of the pending RS request 2050 when the first request set 1RS is output to the memory system 1000 from the RS queue 2020 (101).

Figure 10B:
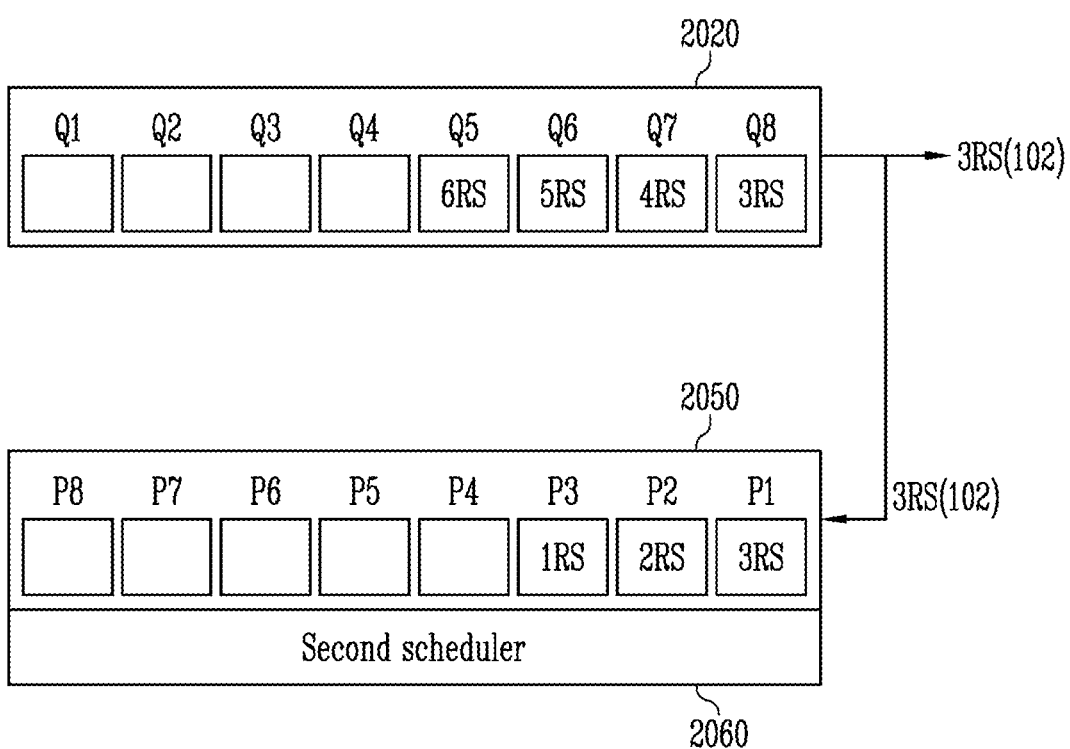

Referring to FIG. 10B, when request sets RS are output from the RS queue 2020, the output request sets RS may be removed from the RS queue 2020, and the request sets RS output from the RS queue 2020 may be accumulated and stored in the pending RS queue 2050. For example, when the first and second request sets 1RS and 2RS are sequentially output from the RS queue 2020 to the memory system 1000, the first and second request sets 1RS and 2RS may also be sequentially input to the pending RS queue 2020. When some of the storage areas included in the RS queue 2020 are empty, new request sets 4RS to 6RS may be continuously input. When the third request set 3RS is output from the RS queue 2020, the third request set 3RS may be simultaneously transmitted to the memory system 1000 and the pending RS queue 2050 (102).

Figure 10C:
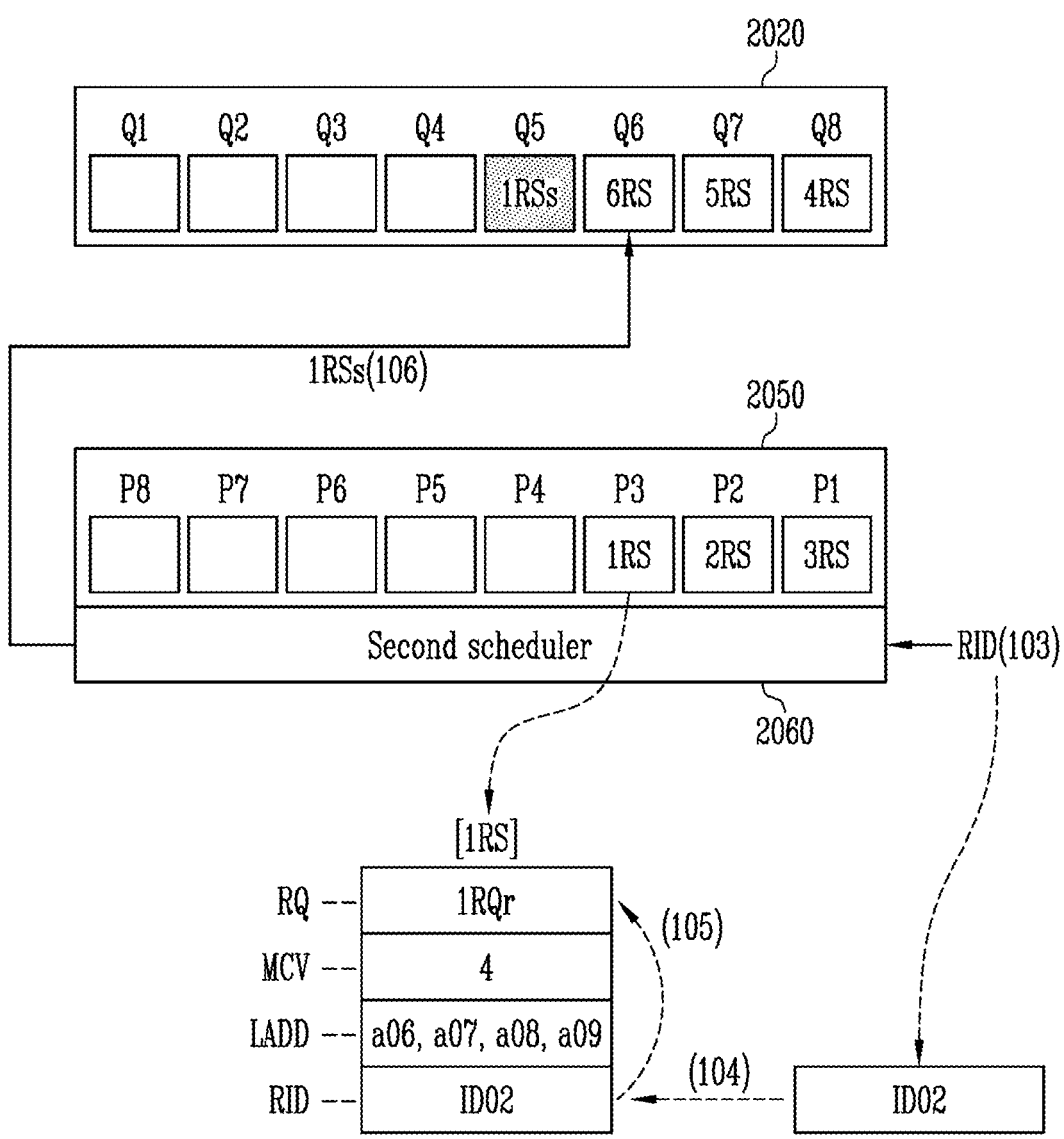

Referring to FIG. 10C, when a read ID RID of ID02 is received from the memory system 1000 (103), the second scheduler 2060 may compare the received read ID RID with a read ID RID stored in the pending RS queue 2050 (104), and search for a request set including the same read ID RID as the received read ID RID (105). For example, when the first request set 1RS includes a first request 1RQ and the read ID RID of ID02, the first request set 1RS may be selected in response to the received read ID RID. Since receiving the read ID RID of the first request set 1RS means that the memory system 1000 is ready for outputting read data corresponding to the first request set 1RS, the second scheduler 2060 may generate a first transmission request set 1RSs corresponding to the first request set 1RS and transmit the first transmission request set 1RSs to the RS queue 2020. The first transmission request set 1RSs input to the RS queue 2020 may be queued next to the sixth request set 6RS (106). The first transmission request set 1RSs queued in the RS queue 2020 may be moved to the eighth storage area Q8 only when the fourth to sixth request sets 4RS to 6RS having higher priorities are all output to the memory system 1000.

Figure 10D:
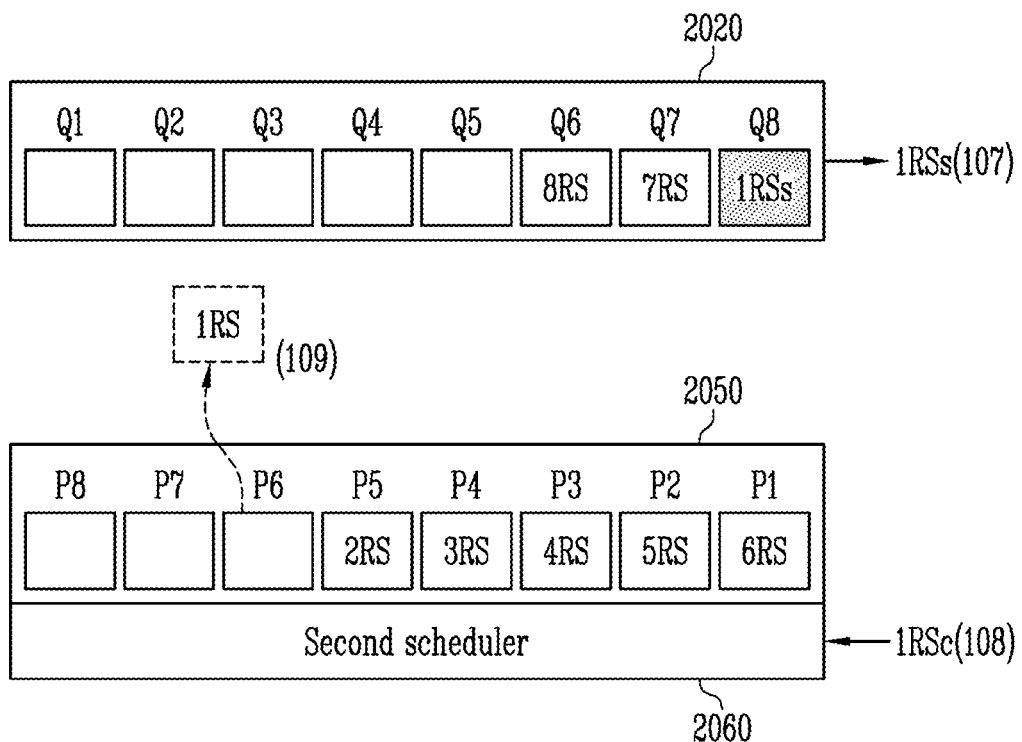

Referring to FIG. 10D, when the first transmission request set 1RSs is moved to the eighth storage area Q8 in the RS queue 2020, the fourth to sixth request sets 4RS to 6RS shown in FIG. 10C may be transmitted to the memory system 1000, and be also stored in the pending RS queue 2050.

When the first transmission request set 1RSs is output to the memory system 1000 from the RS queue 2020 (107), the memory system 1000 may output read data DATA to the host 2000 in response to the first transmission request set 1RSs. The memory system 1000 may also output a first completion request set 1RSc to the host 2000, and the first completion request set 1RSc may be input to the second scheduler 2060 (108). When the first completion request set 1RSc is input to the second scheduler 2060, the second scheduler 2060 may search for the first request set 1RS corresponding to the first completion request set 1RSc in the pending RS queue 2050 and remove the first request set 1RS from the pending RS queue 2050 (109).

Referring to FIG. 10D, since there are empty storage areas in the pending RS queue 2050, the fourth to sixth request sets 4RS to 6RS can be stored in the pending RS queue 2050. Therefore, the first transmission request set 1RSs may be output after the fourth to sixth request sets 4RS to 6RS queued in the RS queue 2020 are sequentially output from the RS queue 2020.

However, when any empty storage area does not exist in the pending RS queue 2050 before the first transmission request set 1RSs queued in the RS queue 2020 is moved to the eighth storage area Q8, the output of the first transmission request set 1RSs from the RS queue 2020 may be blocked. This case will be described hereinafter.

Figure 11:
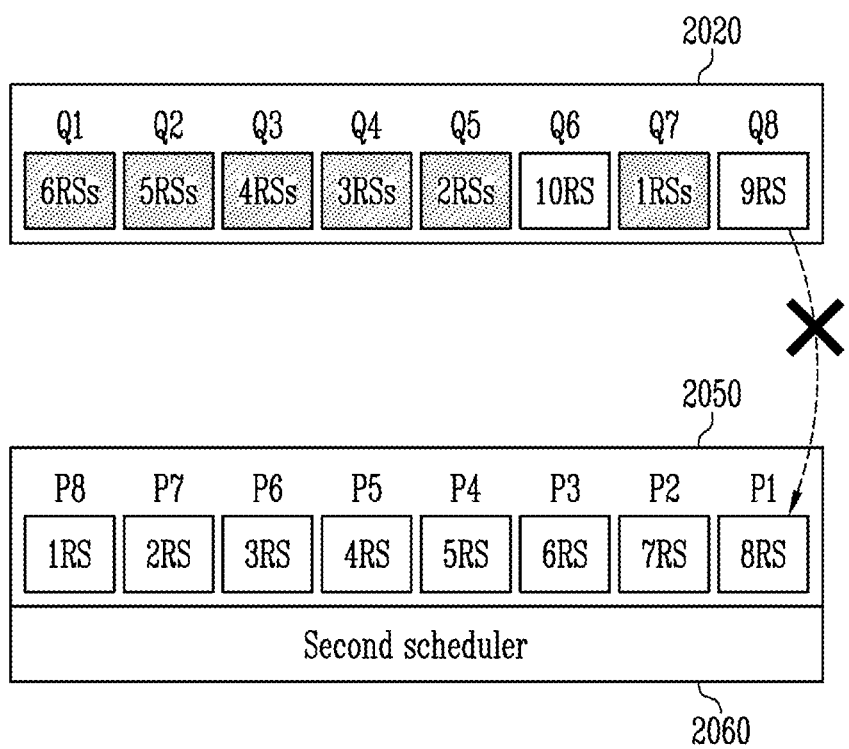
FIG. 11 is a diagram illustrating a case where the output of a request set queued in a request set queue is blocked.

FIG. 11 is a diagram illustrating a case where the output of a request set queued in the RS queue 2020 is blocked.

Referring to FIG. 11, when a ninth request set 9RS having a priority higher than that of the first transmission request set 1RSs is stored in the eighth storage area Q8 of the RS queue 2020 and any empty storage area does not exist in the pending RS queue 2050, the ninth request set 9RS cannot be output from the RS queue 2020. That is, when any empty storage area does not exist in the pending RS queue 2050, the output of the ninth request set 9RS queued in the RS queue 2020 may be blocked.

In an embodiment, to solve the blocking, priorities of some request sets queued in the RS queue 2020 may be changed such that the priority of the first transmission request set 1RSs becomes the highest priority. A method for changing priorities of request sets queued in the RS queue 2020 will be described in detail hereinafter.

Figure 12A:
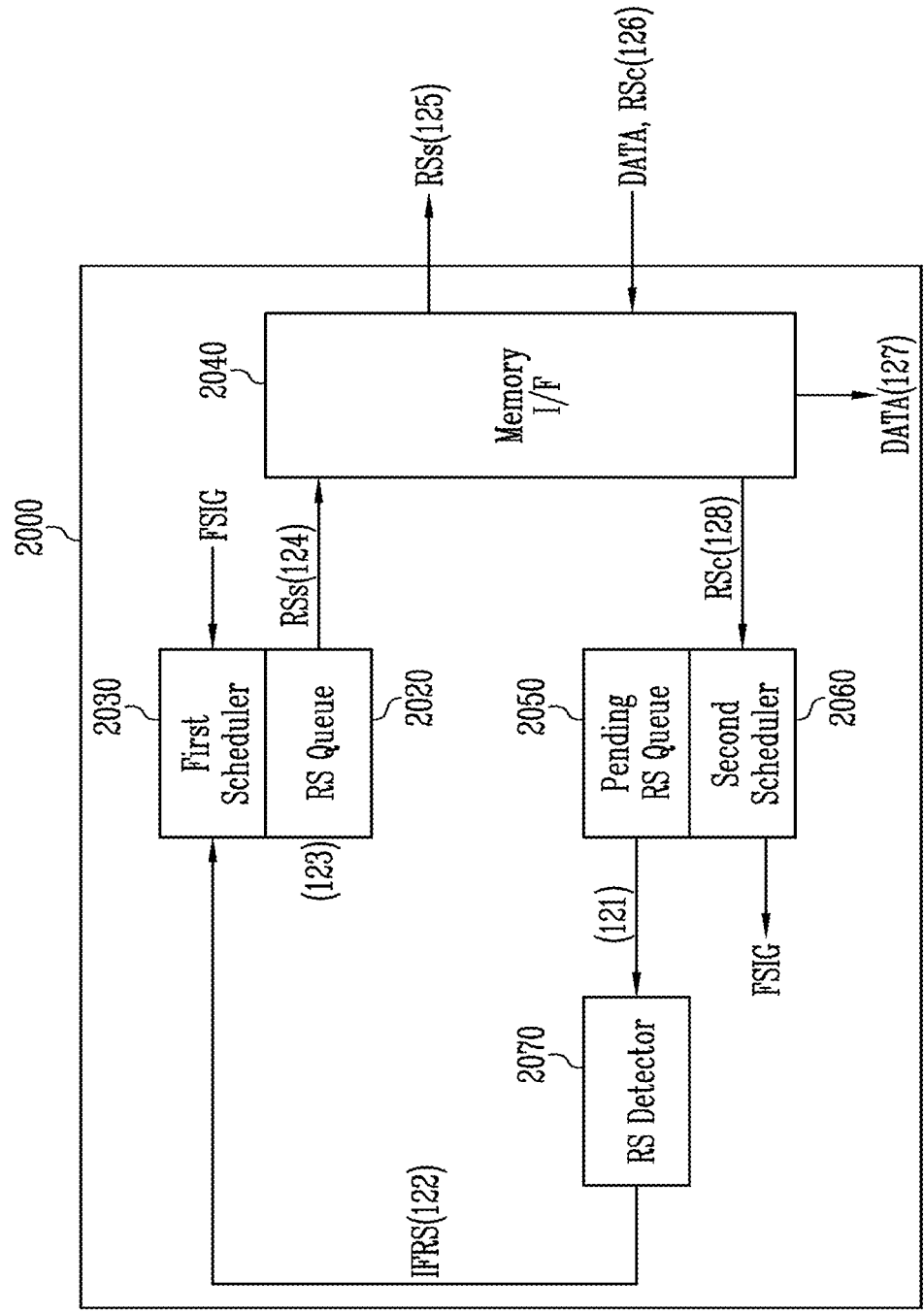
FIGS. 12A to 12C are diagrams illustrating a method for releasing the blocked output of the request set in accordance with an embodiment of the present disclosure.
Figure 12B:
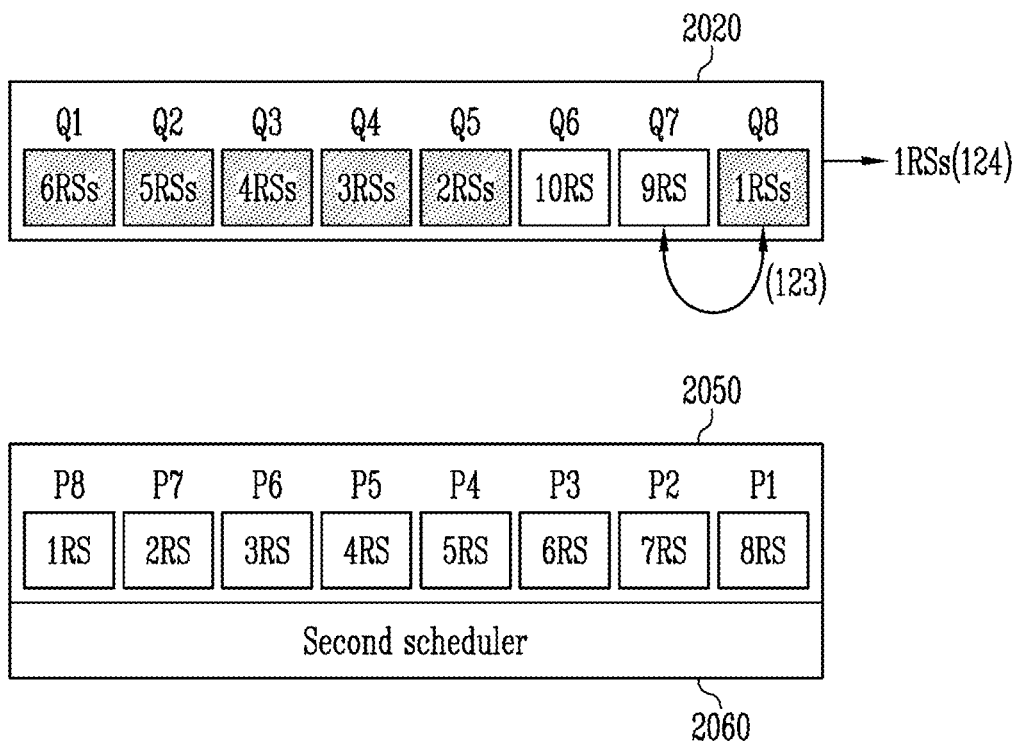
Figure 12C:
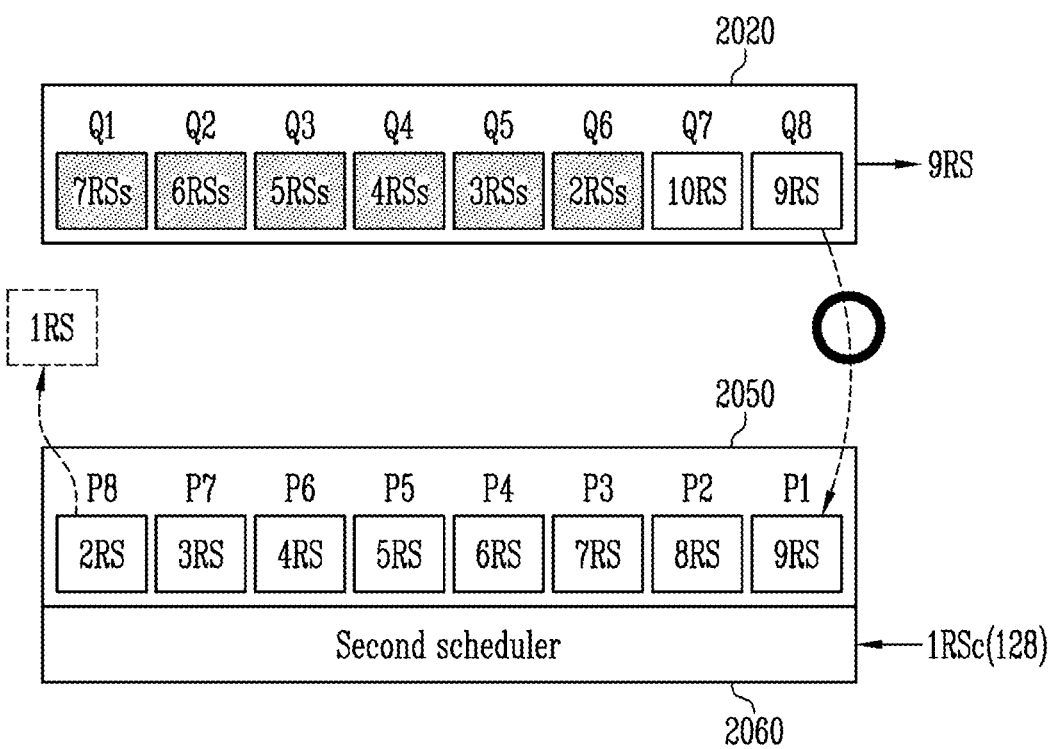

FIGS. 12A to 12C are diagrams illustrating a method for releasing a blocked output of a request set in accordance with an embodiment of the present disclosure.

FIG. 12A shows only components used to release the blocked output of the request set among the components shown in FIG. 5. When it is determined that there is at least one empty storage area in the pending RS queue 2050, the RS detector 2070 may search for a request set RS having the highest priority among pending request sets stored in the pending RS queue 2050 (121). Subsequently, the RS detector 2070 may transmit, to the first scheduler 2030, request information IFRS on the request set RS searched in the pending RS queue 2050 (122).

The first scheduler 2030 may search for a request set having a priority to be changed based on the request information IFRS in the RS queue 2020, and change the priority of the searched request set to become the highest priority (123). For example, when the first transmission request set 1RSs is stored in the seventh storage area Q7 of the RS queue 2020 and the ninth request set 9RS is stored in the eighth storage area Q8 as shown in FIG. 11, the first scheduler 2030 may exchange the priorities of the first transmission request set 1RSs and the ninth request set 9RS from each other according to the request information IFRS. That is, as shown in FIG. 12B, the priority of the first transmission request set 1RSs may be changed to become the highest priority by storing the ninth request set 9RS in the seventh storage area Q7 and storing the first transmission request set 1RSs in the eighth storage area Q8 (123). After that, since the first transmission request set 1RSs is not transmitted to the pending RS queue 2050, the first transmission request set 1RSs may be output from the RS queue 2020 (124).

When the memory I/F 2040 receives a transmission request set RSs, e.g., the first transmission request set 1RSs, from the RS queue 2020, the memory I/F 2040 may output the received transmission request set RSs to the memory system (125).

The memory system 1000 may output, to the host 2000, read data DATA and a completion request set RSc in response to the transmission request set RSs (126).

The memory I/F 2040 may transmit the received data DATA to a device (not shown) which processes data (127), and transmit the completion request set RSc to the second scheduler 2060 (128).

The second scheduler 2060 may search for a request set corresponding to the completion request set RSc in the pending RS queue 2050, and remove the searched request set from the pending RS queue 2050. As a result, since an empty storage area is generated in the pending RS queue 2050, a next request set, i.e., the ninth request set 9RS, queued in the RS queue 2020 may be output and stored in the pending RS queue 2050.

For example, receiving the first completion request set 1RSc means that an operation of the first request set 1RS has been completed in the memory system 1000, and therefore, as shown in FIG. 12C, the second scheduler 2060 may remove the first request set 1RS from the pending RS queue 2050 in response to the first completion request set 1RSc. When the first request set 1RS is removed from the pending RS queue 2050, the other second to eighth request sets 2RS to 8RS may be moved one by one to storage areas having higher priorities. Therefore, since the first storage area P1 becomes an empty area, the ninth request set 9RS having the highest priority in the RS queue 2020 may be output from the RS queue 2020, and be stored in the first storage area P1 of the pending RS queue 2050.

In the embodiment described above with reference to FIGS. 9 to 12C, a priority of a transmission request set corresponding to a request set having the highest priority among the request sets queued in the pending RS queue 2050 has been changed based on the request information IFRS that indicates the request set having the highest priority among the request sets queued in the pending RS queue 2050.

Hereinafter, a method for changing priorities of transmission request sets queued in the RS queue 2020 based on merge count values of pending request sets queued in the pending RS queue 2050 will be described.

FIG. 13 is a flowchart illustrating a request set management method in accordance with a second embodiment of the present disclosure. The method illustrated in FIG. 13 will be described with reference to FIG. 5.

Referring to FIGS. 5 and 13, the second scheduler 2060 may check whether the storage areas of the pending RS queue 2050 are fully filled with request sets RS at S131. For example, when it is determined that the storage areas of the pending RS queue 2050 are not fully filled, the second scheduler 2060 may inactivate the full signal FSIG. When it is determined that the storage areas of the pending RS queue 2050 are fully filled, the second scheduler 2060 may activate the full signal FSIG.

When an empty storage area exists in the pending RS queue 2050, i.e., when the pending RS queue 2050 is not fully filled, the second scheduler 2060 inactivates the full signal FSIG. Therefore, the first scheduler 2030 may output request sets RS or transmission request sets RSs to the memory system 1000 in an order in which the request sets RS or the transmission request sets RSs are stored in the RS queue 2020 at S134.

When an empty storage area does not exist in the pending RS queue 2050, i.e., when the pending RS queue 2050 is fully filled, the second scheduler 2060 may check merge count values MCV of request sets queued in the pending RS queue 2050, and select a request set having the lowest or smallest merge count value at S132. Since the merge count value MCV represents the number of requests merged in one request set, a request set in which requests are not merged may have a merge count value MCV of 1, and a request set in which 2 or more requests are merged may have a merge count value MCV of 2 or more. For example, when two requests are merged in one request set, the merge count value MCV may be 2. When four requests are merged in one request set, the merge count value MCV may be 4.

The first scheduler 2030 may receive request information IFRS on a request set RS having the lowest or smallest merge count value MCV, selects a transmission request set RSs corresponding to the request set RS having the lowest or smallest merge count value MCV among the transmission request sets RSs queued in the RS queue 2020 based on the received request information IFRS, and change a priority of the selected transmission request set RSs to be the highest priority at S133.

Subsequently, the first scheduler 2030 may output the transmission request set RSs according to the changed priority at S134. The transmission request set RSs may be transmitted to the memory system 1000 through the memory I/F 2040.

The method for changing the priority of the transmission request set in accordance with the above-described second embodiment will be described in detail hereinafter.

Figure 14A:
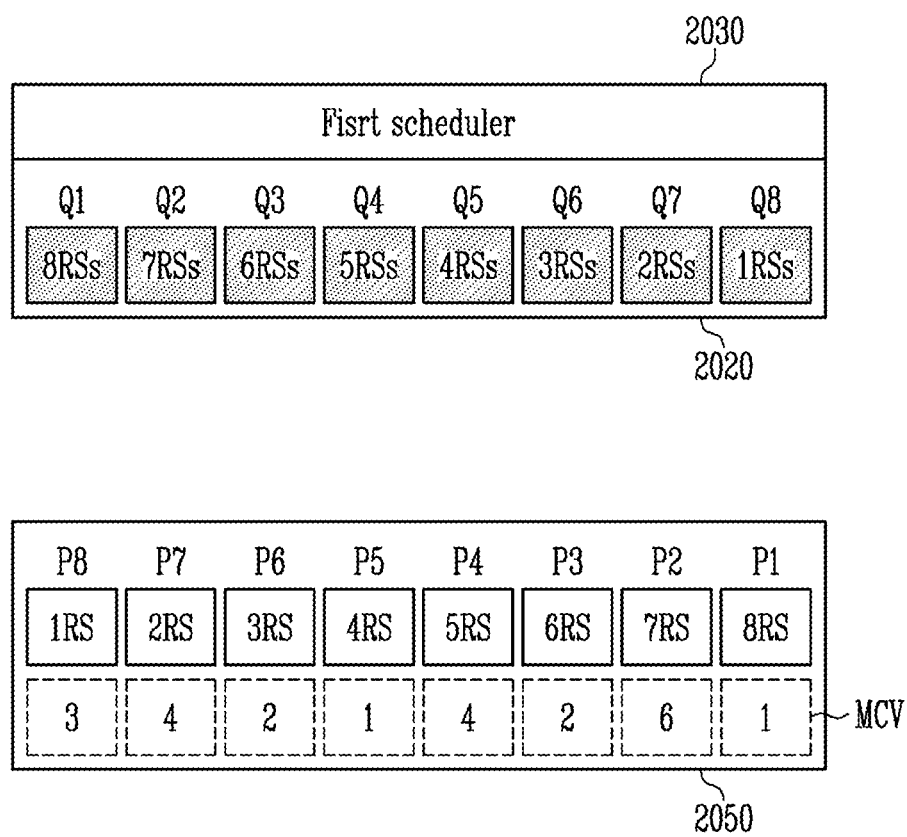
FIGS. 14A and 14B are diagrams illustrating a method for changing transmission priorities of request sets queued in a request set queue in accordance with the second embodiment of the present disclosure.
Figure 14B:
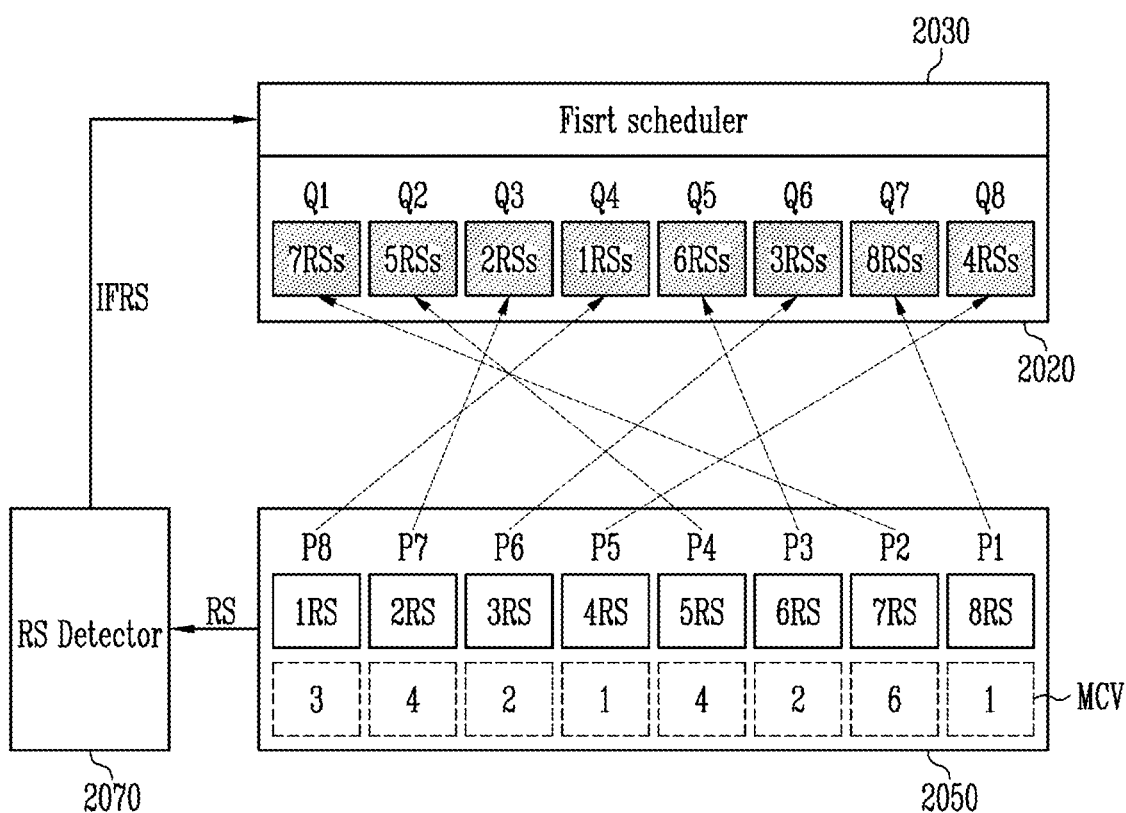

FIGS. 14A and 14B are diagrams illustrating the method for changing priorities of transmission request sets queued in the RS queue 2020 in accordance with the second embodiment of the present disclosure.

Referring to FIG. 14A, each of the request sets 1RS to 8RS stored in the pending RS queue 2050 includes its own merge count value MCV. Since a merge count value MCV represents the number of requests merged in one request set, the merge count value MCV may be the number of requests to be processed in the memory system 1000 based on the request set. Therefore, when a request set has a merge count value MCV of 1, the request set may be a request set in which requests are not merged. When a request set has a merge count value MCV is 3, the request set may be a request set in which three requests are merged. Therefore, when the requests are for read operations, the number of read operations performed in the memory system 1000 becomes smaller as the merge count value MCV becomes smaller, so that a time required to output read data may be decreased.

Referring to FIG. 14B, when the storage areas P1 to P8 of the pending RS queue 2050 are fully filled, the RS detector 2070 may receive information on a request set RS in an order in which a merge count value MCV increases, and sequentially output request information IFRS according to the received information on the request set RS. When request sets RS having the same merge count value MCV exist in the pending RS queue 2050, a request set having a higher priority among the request sets RS having the same merge count value MCV may be preferentially selected and transmitted to the RS detector 2070.

For example, referring to FIG. 14B, among merge count values MCV of the first to eighth request sets 1RS to 8RS that are stored in the pending RS queue 2050, the fourth request set 4RS and the eighth request set 8RS have the same merge count value MCV of 1, and a priority, i.e., 5, of the fourth request set 4RS is higher than a priority, i.e., 1, of the eighth request set 8RS. Therefore, in the RS queue 2020, a priority of a fourth transmission request set 4RSs corresponding to the fourth request set 4RS may be changed to become the highest priority. An eighth transmission request set 8RSs corresponding to the eighth request set 8RS may be changed to become the second highest priority.

In this manner, priorities of first to eighth transmission request sets 1RSs to 8RSs are changed in an order of the fourth, eighth, third, sixth, first, second, fifth, and seventh transmission request sets 4RSs, 8RSs, 3RSs, 6RSs, 1RSs, 2RSs, 5RSs, and 7RSs. The fourth transmission request sets 4RSs has the highest priority, and the seventh transmission request sets 7RSs has the lowest priority.

Although a case where only the transmission request sets RSs are queued in the RS queue 2020 is illustrated in FIGS. 14A and 14B, request sets RS for one or more of read, program, and erase operations may be queued in the RS queue 2020 in addition to the transmission request sets RSs. In this case, a priority of a transmission request set RSs corresponding to a request set RS having a lowest or smallest merge count value MCV in the pending RS queue 2050 may be changed to become the highest priority.

In accordance with the present disclosure, request sets pending in the host 2000 can be easily managed.

Although not shown, in an embodiment of the present disclosure, each of the transmission request set RSs and the completion request set RSc may include elements similar to those included in a request set RS, such as RQ, MCV, LADD, and RID, as shown in FIG. 7.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A method of operating a host, the method comprising:
   generating one or more operation request sets for requesting a memory system to perform operations by merging requests corresponding to addresses that are continuous;
   storing operation request sets including read operation requests and transmission request sets for requesting the memory system to transmit data read out according to the read operation requests in a first request set queue;
   storing pending operation request sets whose operations are being performed in the memory system among the operation request sets sequentially output from the first request set queue in a second request set queue;
   transmitting, to the first request set queue, the transmission request sets which are generated in response to read information indicating that the memory system is ready to output the data corresponding to the read operation requests;
   transmitting, to a first scheduler, request information indicating a target operation request set having a highest priority among the pending operation request sets stored in the second request set queue, when the second request set queue is fully filled with the pending operation request sets;
   changing a priority of a target transmission request set corresponding to the target operation request set to become a highest priority in the first request set queue based on the request information; and
   outputting sequentially the operation request sets and the transmission request sets to the memory system according to priorities of the operation request sets and the transmission request sets.

2. The method of claim 1, wherein the generating one or more operation request sets comprises,
   generating an operation request set for each of requests corresponding to discontinuous addresses sequentially received.

3. The method of claim 1, wherein the generating one or more operation request sets comprises:
   generating an operation request set by merging the requests respectively corresponding to the continuous addresses when the requests correspond to a same operation; and
   generating an operation request set for each of the requests when the requests correspond to different operations from each other even though the addresses are continuous.

4. The method of claim 1, wherein the storing the pending operation request sets comprises,
   activating a full signal when the second request set queue is full; and
   wherein the changing the priority of the target transmission request set comprises,
   changing the priority of the target transmission request set to become the highest priority in the first request set queue when the full signal is activated.

5. The method of claim 4, wherein the activating the full signal comprises,
   inactivating the full signal when an empty storage area is included in the second request set queue.

6. The method of claim 1, further comprising,
   outputting, to the memory system, the operation request sets and the transmission request sets, which are output from the first request set queue, or transmitting the read information received from the memory system to a second scheduler which transmits the transmission request sets.

7. The method of claim 6, further comprising,
   transmitting a completion request signal to the second scheduler when a completion request set representing that execution of an operation request set output to the memory system has been completed is received from the memory system; and
   removing an operation request set corresponding to the completion request signal from the second request set queue.

* * * * *